United States Patent [19]

Najjar et al.

[11] Patent Number: 4,801,402

[45] Date of Patent: * Jan. 31, 1989

[54] PARTIAL OXIDATION PROCESS

[75] Inventors: Mitri Salim Najjar, Hopewell Junction; Walter C. Gates, Jr., Carmel, both of N.Y.

[73] Assignee: Texaco Inc., White Plains, N.Y.

[*] Notice: The portion of the term of this patent subsequent to Mar. 31, 2004 has been disclaimed.

[21] Appl. No.: 926,496

[22] Filed: Nov. 3, 1986

Related U.S. Application Data

[63] Continuation-in-part of Ser. No. 797,360, Nov. 12, 1985, Pat. No. 4,654,164, and a continuation-in-part of Ser. No. 749,375, Jun. 25, 1985, Pat. No. 4,668,428, and a continuation-in-part of Ser. No. 749,376, Jun. 25, 1985, Pat. No. 4,668,429.

[51] Int. Cl.$^4$ .................................................. C01B 3/31
[52] U.S. Cl. .................................. 252/373; 48/197 R; 208/47; 208/53
[58] Field of Search ................... 252/373; 208/47, 50, 208/53; 48/197 R

[56] References Cited

U.S. PATENT DOCUMENTS

| | | | |
|---|---|---|---|
| 3,607,157 | 9/1974 | Schlinger et al. | 48/202 |
| 3,707,462 | 12/1972 | Moss | 208/53 |
| 3,983,030 | 9/1976 | Rosynek et al. | 208/53 |
| 4,654,164 | 3/1987 | Najjar | 252/373 |
| 4,668,428 | 5/1987 | Najjar | 252/373 |
| 4,668,429 | 5/1987 | Najjar | 252/373 |

*Primary Examiner*—Bruce D. Gray
*Attorney, Agent, or Firm*—Robert A. Kulason; James J. O'Loughlin; Albert Brent

[57] ABSTRACT

Synthesis gas is produced by the partial oxidation of a feedstock comprising petroleum coke containing metal sulfide compounds and metal oxy-sulfide compounds and having an ash that contains nickel, vanadium and silicon. In the process, a petroleum coke addition agent, such as elemental iron and/or iron compounds, is introduced into the upper section of a delayed coker and above the level of the nickel and vanadium ash-containing heavy liquid hydrocarbonaceous fuel being simultaneously introduced upwardly from the bottom of said delayed coker. By this means the petroleum coke addition agent is distributed uniformly across the surface of liquid hydrocarbonaceous material being coked and then uniformly distributed throughout the liquid fuel. In the delayed coker, a portion of the petroleum coke addition agent is reacted with a portion of the sulfur in the heavy liquid hydrocarbonaceous fuel to produce metal oxy-sulfides and metal sulfides. After coking, the solid petroleum coke is ground and introduced into the free-flow partial oxidation gas generator as feed. Since the petroleum coke containing the dispersed addition agent is ground together to the proper size for reaction in the partial oxidation gas generator, the addition agent may be originally purchased to a larger particle size at a significant reduction in cost. In the reaction zone of the gasifier, in a preferred embodiment the petroleum coke addition agent containing metal sulfides and metal oxy-sulfides combines with at least a portion of the nickel constituents and sulfur found in the fuel feedstock to produce a liquid phase washing agent that collects and transports at least a portion of the vanadium-containing oxide laths and spinels and other ash components out of the reaction zone. By this method, molten slag having a reduced viscosity and containing the nickel and vanadium-containing impurities from the feedstock are readily removed from the gas generator at a lower temperature. Further, the life of the refractory lining is extended. Alternatively, a petroleum coke addition agent is used in the process which will increase the ash fusion temperature of the ash produced by the partial oxidation of the petroleum coke containing uniformly distributed addition agent.

24 Claims, No Drawings

PARTIAL OXIDATION PROCESS

This is a continuation-in-part of Ser. No. 797,360, filed Nov. 12, 1985, now U.S. Pat. No. 4,654,164; and Ser. No. 749,375, filed June 25, 1985, now U.S. Pat. No. 4,668,428; and Ser. No. 749,376, filed June 25, 1985, now U.S. Pat. No. 4,668,429.

FIELD OF THE INVENTION

This invention relates to the production of ash-containing petroleum coke and the partial oxidation thereof to produce gaseous mixtures comprising $H_2+CO$. More particularly it pertains to a method for increasing the effectiveness of additive systems for removing nickel and vanadium-containing contaminants along with other molten ash components which are produced during the partial oxidation of petroleum coke having a nickel and vanadium-containing ash to produce synthesis gas, reducing gas, or fuel gas.

The partial oxidation of petroleum coke is a well known process. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid coking). A good deal of current refinery expansion includes the installation or expansion of coker units, and thus, coking will be a process of general use for some time to come. Petroleum coke is a low cost feedstock for the partial oxidation process.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for petroleum coke. For example, water slurries of petroleum coke are reacted by partial oxidation in coassigned U.S. Pat. No. 3,607,157. Gasification is often cited as a convenient means of coke disposition. The Flexicoking Process is an integrated coker/gasifier operation but is often criticized because of the gasifier design. Further, no molten petroleum coke ash having a reduced ash fusion temperature is produced. The decision to use gasification as a coke disposal means is generally based on economics. The expected rise in energy costs and legislation (primarily Canadian) requiring total use of feed crude should shortly bring about a great utilization of petroleum coke feeds to the partial oxidation gas generator.

Previous gasification runs with delayed coke with or without ash-containing heavy liquid hydrocarbonaceous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium can catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel carbonyl deposits downstream in the system. Fluxing as used in coal operations and in U.S. Pat. Nos. 1,799,885 and 2,644,745 does not provide a solution to applicant's problem involving troublesome vanadium and nickel. The subject invention is an improvement in the art since it permits long time operation of the partial oxidation gas generator without shut-down due to failure of the refractory lining in the reaction zone that was brought about by the presence of vanadium. In addition, it teaches how smaller amounts of petroleum coke addition agents may be used in a more effective way.

SUMMARY OF THE INVENTION

This is a process for the production of gaseous mixtures comprising $H_2+CO$ by the partial oxidation of a feedstock comprising petroleum coke having a nickel and vanadium-containing ash. Further, said feedstock includes a minimum of 0.5 wt. % of sulfur; and said ash includes a minimum of 5.0 wt. % of vanadium, a minimum of 2.0 wt. % of nickel, such as 2.0 to 5.0 wt. %, and up to about 50,000 parts per million (ppm) of silicon, or more. The process includes the steps of (1) introducing a heavy liquid hydrocarbonaceous fuel feedstock having a nickel and vanadium-containing ash and containing sulfur at a temperature in the range of about 800 to 895° F. upwardly into the bottom of a delayed coking zone; (2) simultaneously, introducing a petroleum coke addition agent having a particle size in the range of about 3000 microns to 38 microns, or below into the upper section of said coking zone above the upper level of the material in said coking zone being converted into petroleum coke; where in said coking zone a portion of said petroleum coke addition agent reacts with a portion of the sulfur in said fuel feedstock to produce solid oxy-sulfide compounds and sulfide compounds and said reacted and unreacted portions of the petroleum coke addition agent are well dispersed in the heavy liquid hydrocarbonaceous fuel in said coking zone during the filling period and a portion of the holding period; (3) coking said heavy liquid hydrocarbonaceous fuel feed from (2) in said coking zone; (4) removing solid petroleum coke and removing gaseous materials comprising hydrocarbon gases, $H_2O$, and a reduced amount of $H_2S$ and $SO_2$ from said coking zone; (5) grinding said petroleum coke from (4) to a particle size in the range of about 250 microns to 850 microns; and (6) introducing said ground petroleum coke as the fuel feed into a refractory lined free-flow unobstructed down-flowing partial oxidation reaction zone where said petroleum coke is reacted with a free-oxygen containing gas at a temperature in the range of about 2200° F. to about 3000° F. and a pressure in the range of about 5 to 250 atmospheres in the presence of a temperature moderator and in a reducing atmosphere to produce a hot raw effluent gas stream comprising $H_2+CO$ and molten slag, and a reduced amount of $H_2S$ and COS, if any. Nongaseous materials are then separated from the hot raw effluent gas stream.

In a preferred embodiment, heavy liquid hydrocarbonaceous fuel which contains a minimum of 0.5 wt. % of sulfur, and ash which includes a minimum of 5.0 wt. % vanadium, a minimum of 2.0 wt. % of nickel and less than 350 parts per million of silicon is fed to the delayed coking zone. The petroleum coke addition agent which is simultaneously introduced into the delayed coking zone and mixed with the heavy liquid hydrocarbonaceous fuel comprises elemental iron and/or iron compound, or alternatively a copper compound. The petroleum coke addition agent combines in the coking zone with at least a portion of the sulfur found in the heavy liquid hydrocarbonaceous fuel feedstock to the delayed coker to produce oxy-sulfides of iron and sulfide compounds of iron and nickel that become well dispersed in the petroleum coke. The petroleum coke is removed from the coke drum, ground to size, and introduced into the partial oxidation gas generator as the fuel feedstock. In the gas generator, the petroleum coke additive and the oxy-sulfide and sulfide reaction products thereof combine with at least a portion of the nickel constituents and sulfur present in the reaction zone of the gas generator to produce a low viscosity liquid phase washing agent or carrier. This washing agent does not solubilize the troublesome vanadium-containing oxide laths and spinels, but rather serves as a carrier and washes them out of the reaction zone of the partial oxidation gas generator along with other ash components and bits of refractory.

In still other embodiments, a small amount of an additional additive compound selected from the group consisting of calcium, magnesium, chromium, and mixtures thereof is introduced into the coking zone in combination with said petroleum coke additive. The magnesium and chromium further increase the life of the refractory lining of the gas generator.

DISCLOSURE OF THE INVENTION

The partial oxidation of petroleum coke and heavy liquid hydrocarbonaceous fuel and petroleum coke are described respectively in coassigned U.S. Pat. Nos. 3,607,156 and 4,411,670, which are incorporated herein by reference. Further, suitable unobstructed free-flow down-flowing refractory lined gas generators and burners that may be used in the production of synthesis gas, reducing gas, or fuel gas from these materials are also described in the aforesaid references. Advantageously, the subject process uses relatively inexpensive feedstocks comprising petroleum coke having nickel and vanadium-containing ashes. Further, said feedstock includes a minimum of 0.5 wt. % of sulfur, such as at least 2.0 wt. % sulfur; and said ash includes a minimum of 5.0 wt. % of vanadium, a minimum of 2.0 wt. % of nickel, such as 2.0 to 5.0 wt. %, and up to about 50,000 parts per million (ppm) of silicon, or more, such as about 100 to 1000 ppm. In one embodiment the silicon content may be as much as about 150,000 ppm.

By definition, the term petroleum coke having a nickel and vanadium-containing ash is petroleum coke made from ash containing heavy liquid hydrocarbonaceous fuel by conventional coking methods such as by the delayed coking process, such as described in coassigned U.S. Pat. No. 3,673,080, which is incorporated herein by reference.

By definition, the term heavy liquid hydrocarbonaceous material or fuel having a nickel and vanadium-containing ash is a petroleum or coal derived fuel selected from the group consisting of virgin crude, residua from petroleum distillation and cracking, petroleum distillate, reduced crude, whole crude, asphalt, coal tar, coal derived oil, shale oil, tar sand oil, and mixtures thereof. Further, said heavy liquid hydrocarbonaceous fuel includes a minimum 0.5 wt. % of sulfur, such as at least 2.0 wt. % sulfur; and said ash includes a minimum of 5.0 wt. % of vanadium, a minimum of 2.0 wt. % of nickel, such as 2.0 to 5.0 wt. %, and up to about 50,000 parts per million (ppm) of silicon or more, such as about 100 to 1000 ppm. In one embodiment the silicon content may be as much as about 150,000 ppm.

Closer study of the ash derived from the partial oxidation, without an additive, of petroleum coke having nickel and vanadium-containing ashes shows that it is largely composed of oxide (and optionally sulfide) compounds of vanadium, nickel, iron, along with some normally occurring mineral matter species. Vanadium-containing oxide laths present are selected from the group consisting of V, V+Ca, V+Fe, V+Al, and mixtures thereof. Vanadium-containing spinels are present in the form of spinel-type aluminate phases with any metals selected from the group consisting of V, Fe, Cr, Al, Mg and mixtures thereof. The presence of abundant interlocking needle to lath-like crystals is the cause of the high viscosity of the slag.

The metals present in the ash provide a system that is significantly different from that occurring in coal. A further factor is that the total ash content of the petroleum coke or heavy liquid hydrocarbonaceous fuel may be only about one-half to 5 weight percent (wt. %), whereas coal typically contains 10-20 wt. % ash. The comparatively low ash concentration in petroleum coke and heavy liquid carbonaceous fuel may be the reason why the ash removal problem is only noticed after prolonged gasifier runs. The likelihood for effective ash and additive mixing that is necessary to wash the vanadium constituents out of the reaction zone or for effective fluxing is therefore greatly reduced It is theorized that in the ash-containing petroleum coke and heavy liquid hydrocarbonaceous fuel systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vanadate states. These materials prove to be very corrosive to refractory thereby decreasing the life of the refractory lining of the reaction zone. In the case of when the petroleum coke additive and the ash in the feedstock are improperly mixed due to the short residence time in the gasifier, e.g. about 0.2-10 seconds, a substantial part of the vanadium is not captured and part of the petroleum coke additive leaves the reaction zone unused. These problems and others are minimized by the subject process in which the amount of vanadium constituents remaining in the reaction zone is substantially reduced or eliminated.

This invention provides an improved partial oxidation process for producing synthesis gas, fuel gas, or reducing gas from petroleum coke containing heavy metal compounds from the group consisting of vanadium, nickel, and iron. Further, a means of introducing petroleum coke addition agents into the system to give maximum effectiveness is provided. In the subject process, the petroleum coke addition agent is first introduced into a coking zone, e.g. delayed coker, where a portion is reacted with a portion of the sulfur in the heavy liquid hydrocarbonaceous fuel to produce metal oxy-sulfides and metal sulfides. The reacted and unreacted portions of the petroleum coke addition agent are well dispersed in the heavy liquid hydrocarbonaceous fuel and coked in the delayed coker. Then, the solid coke from the coker is ground; and the comminuted petroleum coke is reacted by partial oxidation in the free-flow unobstructed gas generator to produce gaseous mixtures comprising $H_2+CO$.

Several types of petroleum coke addition agents may be introduced into the delayed coker. Types I and II are described below. The ash fusion temperatures may be raised or lowered by specific addition agents. Vanadium and nickel constituents in the ash may be fluxed or washed by compounds formed by the petroleum coke addition agent. By this means, the troublesome nickel and vanadium heavy metals may be collected and removed.

Type I—Petroleum Coke Addition Agents That Reduce The Ash Fusion Temperature and/or Which Act As A Liquid Phase Washing Agent.

1. Inorganic or organic iron compounds and/or elemental iron. The weight ratio of iron to vanadium in the reaction zone is at least 10. Optionally, calcium compounds in the amount of about 10 to 70 wt. % of the petroleum coke addition agent may be added when the silicon content of the heavy liquid hydrocarbonaceous fuel feed is 400 ppm or more. In one embodiment, when the heavy liquid hydrocarbonaceous fuel contains . less than 350 ppm or Silicon, then a calcium compound in the amount of 2.0 to below 8.0 wt. % of said petroleum coke addition agent may be introduced into the delayed coker along with the elemental iron and/or iron compound. See coassigned U.S. Pat. Nos. 4,668,428 and 4,668,429, which are incorporated herein by reference.

2. Mixture of the silicates of Fe, Ca, Mg, and Al; wherein the wt. ratio of addition agent to ash from feed after partial oxidation is in the range of 0.5 to 10. See coassigned U.S. Pat. No. 4,665,792, which is incorporated herein by reference.

3. Iron sulfide containing material or iron and sulfur containing reactant materials that react in the gasifier to produce iron and sulfur containing compounds. The amount of iron in the molten ash is greater than 10.0 wt. %. See coassigned U.S. Pat. No. 4,692,172, which is incorporated herein by reference.

4. A mixture comprising 50 wt. % or more of a manganese compound and the remainder comprises a silicon compound; wherein the weight ratio of addition agent to the ash in the ash-containing fuel is in the range of about 0.5 to 10. See coassigned U.S. Pat. No. 4,705,539, which is incorporated herein by reference.

5. A copper compound; wherein the weight ratio of copper-containing additive to ash in the fuel feedstock is in the range of about 1.0 to 10. See coassigned U.S. Pat. No. 4,654,164, which is incorporated herein by reference.

Type II—Petroleum Coke Addition Agents That Increase the Ash Fusion Temperature.

1. Silicon, quartz, titanium compounds, and mixtures thereof; wherein the weight ratio of addition agent to ash in the ash-containing fuel is in the range of about 0.5 to 10. See coassigned U.S. Pat. No. 4,705,538, which is incorporated herein by reference.

In the subject process, simultaneously with the introduction of the sulfur-containing heavy liquid hydrocarbonaceous fuel feed having a nickel and vanadium-containing ash into the conventional delayed coker, the petroleum coke addition agent is introduced into the upper section of said delayed coking apparatus above the upper level of the material in said coking zone then being converted into petroleum coke. The preferred particle size of the comminuted petroleum coke addition agent that is introduced into the delayed coking zone is in the range of about 3000 microns to 38 microns, or below, such as about 2000 microns to 212 microns, or below. The dry ground petroleum coke addition agent may be mixed with water or a liquid hydrocarbonaceous material or both to produce a pumpable slurry having a solids content in the range of about 5–50 wt. %. Alternatively, the petroleum coke addition agent may be wet ground with the liquid slurry medium. Alternatively, the petroleum coke addition agent may be entrained in a gaseous medium and then introduced into the delayed coker. The gaseous transport medium may be selected from the group consisting of steam, $CO_2$, $N_2$, recycle synthesis gas, and mixtures thereof.

In the delayed coking process, such as shown and described in coassigned U.S. Pat. No. 3,673,080, which is incorporated herein by reference, a high boiling petroleum oil is heated to a temperature in the range of about 900° to 930° F. in a coking heater and then introduced upwardly into the bottom of a coke drum. The hot effluent from the coking heater may comprise high boiling liquid petroleum and cracked compounds of said high boiling liquid petroleum, hydrocarbon vapors, and a comparatively small amount of water vapor. The effluent from the coking heater is introduced upwardly into the bottom of the coke drum at a temperature in the range of 800° to 895° F. and a pressure in the range of about 40 to 60 psig. The coke drum is stationary and consists of a vertical elongated cylinder having a truncated cone-shaped section at the lower end. The charge is fed to the coke drum axially at the bottom and passes through a deflector assembly mounted on the bottom head inside the coke drum. The deflector assembly consists of a short cylinder with a closed top and with eight elongated vertical slots equally spaced around the walls. These slots divide the charge into eight separate streams. Each stream emerges radially from a slot and then swirls upwardly as directed by the conical shaped sides which form the end section of the vessel. Simultaneously, with the filling of the coke drum from the bottom to the top, dry petroleum coke addition agent may be introduced by way of a separate line at the top of the coke drum. hhe petroleum coke addition agent then falls by gravity into the liquid hydrocarbonaceous fuel rising in the coke drum below. Alternatively, a pumpable slurry comprising liquid hydrocarbonaceous fuel and petroleum coke addition agent is passed through a ring-shaped manifold or sparger located in the top of the coke drum above the level of the heavy liquid hydrocarbonaceous fuel being coked. The slurry of petroleum coke addition agent is sprayed evenly onto the top surface of the liquid material filling the coke drum. The petroleum coke addition agent then thoroughly mixes with the upwardly swirling liquid feedstreams. By the subject process, the petroleum coke addition agent is uniformly dispersed first across the surface of the coking liquid, and then uniformly throughout the solid coke. Addition of petroleum coke addition agent in the dry form or as a slurry is continued during the filling time which represents about 15–25% of the total time in the coke drum, and also during about 50% of the hold time. Thus, the petroleum coke addition agent is added about 65–75% of the total time in the coke drum.

Inside of the coking drum, a portion, e.g. about 10 to 90 wt. % such as about 30 to 70 wt. %, of the petroleum coke addition agent reacts with a portion e.g. about 20 to 80 wt. % of the sulfur in the heavy liquid hydrocarbonaceous fuel feedstock to the coker to produce solid metal oxy-sulfide and metal sulfide compounds of iron and nickel which leave the delayed coker uniformly dispersed in the solid petroleum coke. As the charge fills the coke drum, petroleum coke forms in a manner to be further described. Hydrocarbon vapors at a temperature in the range of 810° to 820° F. and a pressure in the range of about 20 to 45 psig leave from the top of the coke drum and flow into the fractionator, along with a comparatively small amount of water vapor, and a reduced amount of sulfur containing gases.

While the exact mechanism by which the solid petroleum coke is formed is unknown, it may be postulated that in the coke drum the petroleum coke addition agent dispersed in the substantially liquid charge may serve as seeds or nucleating agents on which the hydrocarbons condense, polymerize, and crosslink. Under time temperature conditions in the coking zone the resulting deposit on the surface of a seed particle or on a growing coke particle undergoes dehydrogenation and the formation of a layer of coke. Repetition of this coking cycle causes successive layers of coke to build-up on the growing particle.

Initially, the growing petroleum coke particles will be in suspension in the upwardly swirling feedstream within the coke drum. However, at some point, pellet sized particles will settle out by gravity and deposit on and fuse with other coke pellets at the bottom of the coke drum, forming a cluster of petroleum coke pellets. The pellets harden and the level of the coke bed raises until a batch of petroleum coke fills the coke drum. Advantageously, the comparatively large surface area of the pellets increases their reactivity in the partial oxidation gas generator.

When a coke drum has been filled with a batch of hardened coke to a desired level, it is taken out of service and emptied. First, superheated steam is passed upwardly through the bottom of the coke drum to displace hydrocarbon vapors and to remove any high boiling point hydrocarbons remaining on the coke. Then, after the coke drum has been steamed for a sufficient length of time, e.g. about 1 to 3 hours, the coke drum is filled with water and cooled. The water is then drained from the cooled coke drum, and the top and bottom heads are removed. An axially aligned hole is cut vertically through the coke bed to permit the introduction of high pressure jet streams of water. By this means, the batch of petroleum coke containing the sulfided addition agent is broken up into lumps, removed from the bottom of the drum, and ground to size e.g. less than about 1400 microns.

The preferable particle size of the comminuted petroleum coke containing the sulfided and oxy-sulfided petroleum coke addition agent for introduction into the partial oxidation gas generator as feed is in the range of about 44 microns to 850 microns, or below. The dry ground petroleum coke containing the sulfided and oxy-sulfided addition agent may be mixed with water or a liquid hydrocarbonaceous material or both to produce a pumpable slurry having a solids content in the range of about 5–50 wt. %. Alternatively, the petroleum coke addition agent may be wet ground with the liquid slurry medium. Advantageously by means of the subject process, grinding costs are reduced and the wear on the slurry pumps is minimized because of the sulfided nature of the petroleum coke addition agent that is now uniformly dispersed in the petroleum coke, in comparison with the method of separately grinding and pumping unsulfided petroleum coke addition agent in the metallic oxide form. Further, since the petroleum coke containing the dispersed addition agent is ground together to the proper size for reaction in the partial oxidation gas generator, the addition agent may be originally purchased to a larger particle size at a significant reduction in cost. Alternatively, the petroleum coke containing this sulfided and oxy-sulfided addition agent may be entrained in a gaseous medium and then introduced into the partial oxidation gas generator as the fuel feedstock. The gaseous transport medium may be selected from the group consisting of steam, $CO_2$, $N_2$, recycle synthesis gas, and mixtures thereof.

The partial oxidation of said petroleum coke from the coking zone containing well dispersed portions of the reacted and unreacted petroleum coke additive takes place in a refractory lined free-flow unobstructed downflowing partial oxidation exothermic reaction zone in a reducing atmosphere under the following conditions: temperature—2200° F. to 2900° F., such as about 2300° .F to 2700° F.; say about 2725° F. to 2825° F.; pressure about 5 to 250 atmosphere, such as about 15 to 200 atmosphere; when steam or water is used as a temperature moderator, the $H_2O$/fuel weight ratio is in the range of about 0.1 to 5.0, such as about 0.2 to 0.9; and atomic ratio of free oxygen to carbon in the fuel (O/C ratio) is in the range of about 0.6 to 1.6, such as about 0.8 to 1.4.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Ash is present in the range of about 0.5 to 5.0 wt. %, such as about 1.0 to 3.0 wt. % (basis total weight of fuel feed). Depending on the composition after removal of the entrained particulate carbon and ash by quench cooling and/or scrubbing with water and with or without dewatering and purification, the gas stream may be employed as synthesis gas, reducing gas or fuel gas depending upon its final composition.

In a preferred embodiment, the heavy liquid hydrocarbonaceous fuel feedstock which is introduced upwardly into the bottom of the delayed coker includes a minimum of 0.5 wt. % of sulfur, and has an ash that includes a minimum of 5.0 wt. % vanadium, a minimum of 2.0 wt. % of nickel and less than about 350 parts per million of silicon. The petroleum coke additive that is simultaneously introduced downwardly into the upper section of the coking zone is an iron compound selected from the group of compounds consisting of oxides, sulfides, sulfates, carbonates, chlorides nitrates, and mixtures thereof. Sufficient petroleum coke additive is introduced into the coking zone so that in the reaction zone of the partial oxidation gas generator, the weight ratio of reacted and unreacted petroleum coke additive from the coker to ash from the fuel feedstock present in the reaction zone of the gas generator is in the range of about 1.0–10.0 to 1.0 and there is at least 10 parts by weight of iron for each part by weight of vanadium. In the coking zone at a temperature in the range of about 800 to 895° F., a portion of the iron containing addition agent e.g. about 10 to 90 wt. % and a portion of the iron and nickel constituents of the fuel feedstock e.g. 5 to 70 wt. % react with a portion e.g. about 20 to 80 wt. % of the sulfur in the heavy liquid hydrocarbonaceous fuel feedstock to the coker to produce solid metal oxy-sulfide and metal sulfide compounds e.g. iron and nickel which leave the delayed coker uniformly dispersed in the reacted and unreacted portions of the solid petroleum coke. After being ground to a preferable particle size in the range of about 44 microns to 850 microns, or less, the comminuted solid petroleum coke, including the reacted and unreacted portions of the additive, is introduced into a refractory lined free-flow unobstructed down-flowing partial oxidation reaction zone as the fuel feedstock. Reaction of said petroleum coke takes place in the gasifier with a free-oxygen containing gas at a temperature in the range of about 2200° F. to about 3000° F., a pressure in the range of about 5 to 250 atmosphere in the presence of a temperature moderator and in a reducing atmosphere to produce a hot raw effluent gas stream comprising $H_2+CO$, molten slag, and a reduced amount of $H_2S$ and COS, if any. While in the partial oxidation reaction zone, said petroleum coke addition agent combines with at least a portion of the nickel constituents and sulfur present to produce a low viscosity liquid phase washing agent which washes substantially all of the vanadium-containing oxide laths and spinels out of the reaction zone.

In still another embodiment, the heavy liquid hydrocarbonaceous fuel feedstock to the delayed coker is the same as that described previously but has an ash that contains 400 parts per million (ppm) of silicon or more. It was unexpectedly found that a preferred iron and calcium-containing additive for introducing downward into the upper section of the coking zone and mixing therein with the heavy liquid hydrocarbonaceous material having a nickel and vanadium-containing ash includes elemental iron and/or iron compounds in admixture with calcium compounds said iron compounds and calcium compounds being selected from the group consisting of oxides, sulfides, sulfates, carbonates, cyanides, chlorides, nitrates, and mixtures thereof.

The aforesaid iron and calcium-containing petroleum coke additive comprises about 30.0 to 90.0 wt. %, such as about 50.0 to 80.0 wt. %, (basis weight of petroleum coke addition agent), of elemental iron and/or an iron compound, preferably iron oxide, and the remainder may substantially comprise a calcium compound, preferably calcium oxide. For example, there may be about 10 to 70 wt. %, such as about 20 to 50 wt. %, (basis weight of petroleum coke addition agent), of calcium oxide in the iron and calcium containing additive. In the reaction zone of the partial oxidation gas generator, a first portion of the additive, e.g. about 10–90 wt. %, such as about 25–75 wt. % of the additive combines with a large fraction, e.g. about 40 to 95 wt. %, say about 70 to 90 wt. %, of the nickel constituents and sulfur found in the feedstock to produce a low viscosity liquid phase washing agent or carrier. Advantageously, the sulfur potential in the gas and downstream gas cleaning costs are substantially reduced or possibly eliminated. This washing agent is in the liquid phase at the temperature prevailing in the reaction zone and substantially comprises in wt. %: iron sulfide about 75 to 95, such as about 80 to 90; nickel sulfide about 0.5 to 3, such as about 1 to 2; and iron oxide about 2 to 9, such as about 3 to 6. The viscosity of this washing agent at 2000° F. is in the range of about 10 to 20 poises. Further, it was unexpectedly found that this liquid phase washing agent has a strong wetting capability for the high temperature non-flowing vanadium-containing oxide laths and spinels. This washing agent functions in a completely different manner than that of fluxing additive which may be used for example to solubilize slag constituents in coal. For example, this washing agent does not solubilize the troublesome vanadium-containing oxide laths and spinels. Rather, it serves as a carrier and washes them out of the reaction zone. This washing agent washes from about 40 to 80 wt. %, such as about 60 to 70 wt. %, of the vanadium-containing contaminants out of the partial oxidation gas generator. The mixtures of this liquid phase washing agent and vanadium oxide is referred to herein as slag and comprises about 1 to 10 wt. % such as about 4 to 8 wt. % of vanadium oxide. The use of the iron and calcium-containing additive in this manner to produce a washing agent is substantially different from the use of a calcium carbonate fluxing agent in coassigned U.S. Pat. No. 4,277,365. Further, it was unexpectedly found that high silicon e.g. greater than 350 ppm would not interfere with the formation of the liquid phase washing agent in the partial oxidation reaction zone.

The remainder of the iron and calcium-containing additive unexpectedly combines with at least a portion, e.g. about 30 to 100 wt. %, say about 50 to 80 wt. % of the remaining nickel, iron, calcium and silicon in the reaction zone to generate a liquid oxide-silicate phase that fluxes e.g. dissolves substantially all of the remaining portions of said vanadium-containing oxide laths and spinels and other ash components to produce a substantially homogenous slag. Ordinarily, silicon impurities are immiscible with high melting point vanadium species and will not flux them. However, this problem has been overcome by the subject invention. The liquid oxide-silicate phase has the following chemical composition in wt. %.: calcium oxide about 10 to 70, such as about 15 to 50; iron oxide about 5 to 50, such as about 10 to 25; calcium sulfide about 0 to 1.0, such as about 0.01 to 0.50; silicon dioxide about 5 to 25, such as about 1 to 10; nickel sulfide about 0 to .5, such as about 0.01 to 0.05; and minor ash components and refractory pick-up about 2 to 10, such as about 3 to 6. The slag formed with the liquid oxide-silicate comprises about 1 to 10 wt. % such as about 3 to 7 wt. % of vanadium oxide.

In another embodiment, it was unexpectedly found that other benefits could be achieved by including in the iron and calcium-containing additive, an additional material selected from the group of elements consisting of magnesium, chromium, manganese, and mixtures thereof. The elements are provided as suitable compounds selected from the groups consisting of oxides, hydroxides, carbonates, bicabonates, sulfates, nitrates and mixtures thereof. The total amount of the compounds of magnesium, chromium, manganese and mixtures thereof in the additive may be in the range of about 1.0 to 10.0 wt. %, such as about 2.0 to 8.0 wt. % of the additive.

The addition of the aforesaid supplemental amount of magnesium and/or chromium compound saturates the slag with respect to these constituents thereby preventing their dissolution from the refractory. The life of the refractory lining is thereby extended. It was also unexpectedly found that the addition of a manganese compound increased the fluidity of the slag and lowered the ash fusion temperature of the slag. Specifically, the addition of a manganese compound, such as a manganese oxide, resulted in lowering the ash fusion temperature and enhancing the fluidity of the oxide-silicate slag containing dissolved vanadium constituents.

A suitable amount of iron and calcium-containing additive is introduced into the coking zone along with the fuel feedstock in order to satisfy the following two ratios in the reaction zone of the partial oxidation gas generator: (i) a wt. ratio of iron and calcium-containing additive to ash (noncombustable material) in the reaction zone in the range of about 1.0–10.0 to 1.0, such as at least 2:1 weight ratio, say about 5.0 parts by weight of iron and calcium-containing additive per part by wt of ash in the feedstock; and (ii) at least 10 parts by weight, such as about 10–30, say 20 parts by weight of iron plus calcium for each part by weight of vanadium.

Advantages of the subject process become readily apparent in view of the following example: In the case of heavy liquid hydrocarbonaceous fuel feedstocks with low silicon e.g. less than 350 ppm, to the partial oxidation gas generator, a calcium compound may be introduced into the gasifier to lower the softening temperature of the petroleum coke addition agent by 100° F. to 300° F., such as about 200° F. However, the addition of high amounts of calcium may lead to downstream plugging problems due to the formation of a calcium carbonate phase during cooling. Increased calcium corrosion of the refractory may also occur. Further, sticking of the slag in the dip-tube may then occur thereby blocking the passage of the hot effluent gas stream from the reaction zone into the quench water. Now, by introducing the petroleum coke addition agent into the delayed coker with or without the addition of calcium in accordance with the subject invention, a substantial portion of the sulfur in the fuel feedstock to the coker is captured by the addition agent. Further, sulfided and oxysulfided forms of the petroleum coke addition agent are produced thereby which have a substantial lower softening temperature. For example, the softening temperature of a petroleum coke addition agent may be reduced about 400° F. to 700° F., such as about 500° F. The aforesaid plugging problems and refractory wear problems are thereby eliminated.

Another aspect of this invention is that the petroleum coke addition agent may be selected on the basis of serendipitous catalytic properties in addition to its use in the generation of the washing agent, as previously described. For example, it may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. Again, however, this invention does not depend on the catalytic properties of the iron-containing additive.

Suitable iron-containing petroleum coke addition agents for mixing with the heavy liquid hydrocarbonaceous material having a nickel and vanadium-containing ash include elemental iron and iron compounds selected from the group consisting of oxides, sulfides, sulfates, carbonates, cyanides, chlorides, nitrates, and mixtures thereof. In another embodiment, the iron compound is a water soluble iron salt. In still another embodiment the iron compound is a ferro or ferri organic compound selected from the group consisting of naphthenates, oxalates, acetates, citrates, benzoates, oleates, tartrates, and mixtures thereof. The calcium compound may be selected from the group consisting of calcium oxide, calcium carbonate and calcium hydroxide.

Various modifications of the invention as herein before set forth may be made without departing from the spirit and scope thereof, and therefore, only such limitations should be made as are indicated in the appended claims.

We claim:

1. A process for the production of gaseous mixtures comprising $H_2+CO$ by the partial oxidation of a feedstock comprisng petroleum coke having a nickel and vanadium-containing ash; and said fuel feestock includes a minimum of 0.5 wt. % of sulfur; and said ash includes a minimum of 5.0 wt. % vanandium, a minimum of 2.0 wt. % of nickel and up to about 150,000 parts per million (ppm) of silicon; said process comprising:

(1) introducing a heavy liquid hydrdocarbonaceous fuel feedstock having a nickel and vanadium-containing ash and containing sulfur at a temperature in the range of about 800° to 895° F. upwardly into the bottom of a delayed coking zone; (2) simultaneously, introducing a petroleum coke addition agent having a particle size in the range of about 3000 microns to 38 microns, or below, into the upper section of said coking zone above the upper level of the material in said coking zone being converted into petroleum coke, wherein the weight ratio of said petroleum coke addition agent to ash in the fuel feedstock present in the partial oxidation reaction zone in (6) is in the range of about 0.5–10.0 to 1.0; where in said coking zone the petroleum coke addition agent falls by gravity into the swirling liquid hydrcarbonaceous fuel feedstock rising from below and a portion of said petroleum coke addition agent reacts with a portion of the sulfur in said fuel feedstock to produce solid oxysulfide compounds and sulfide compounds and said reacted and unreacted portions of the petroluem coke addition agent are well dispersed in the heavy liquid hydrocarbonaceous fuel in said coking zone during the filling period and a portion of the holding period; (3) coking aid heavy liquid hydrocarbonaceous fuel feed from (2) in said coking zone to produce petroleum coke having said nickel and vanadium-containing ash and having dispersed therein said solid oxy- sulfide compounds, sulfide compounds, and unreacted petroleum coke addition agent; (4) removing solid petroleum coke and removing gaseous materials comprising hydrocarbon gases, H₂O, and a reduced amount of H₂S and SO₂ from said coking zone; (5) grinding said petroleum coke from (4) to a particle size in the range of about 44 microns to 850 microns and (6) introducing said ground petroleum coke as the fuel feed into a refractory lined free-flow unobstructed downflowing partial oxidation reaction zone where said petroleum coke is reacted with a free-oxygen containing gas at a temperature in the range of about 2200° F. to about 3000° F. and a pressure in the range of about 5 to 250 atmospheres, a H₂O fuel weight ratio in the range of about 0.1 to 5.0, an atmoic ratio (OC) in the range of about 0.6 to 1.6, in the presence of a temperature moderator and in a reducing atmosphere to produce a hot raw effluent gas stream comprising H₂+CO and molten slag comprising vanadium, nickel, and other constituents of the ash in said fuel which are fluxed or washed by said petroleum coke addition agent and said oxy-sulfide and sulfide reaction products thereof, and a reduced amount H₂S and COS, if any in comparison with the amount of H₂S and COS that would be produced without the addition in (2) of said petroleum coke addition agent.

2. The process of claim 22 wherein said iron-containing addition agent in (2) is elemental iron and/or an iron compound.

3. The process of claim 2 where in said delayed coking zone about 20 to 80 wt. % of the sulfur in said heavy liquid hydrocarbonaceous fuel feedstock is converted into the oxysulfides and sulfides of iron and nickel which leave the delayed coking zone dispersed in the solid petroleum coke.

4. The process of claim 2 wherein said heavy liquid hydrocarbonaceous fuel has an ash that comprises 400 ppm of silicon, or more, and said iron-containing addition agent comprises about 30.0 to 90.0 wt. % of elemental iron and/or an iron compound, and the remainder comprises a calcium compound.

5. The process of claim 2 wherein said iron-containing addition agent in (2) is a water soluble iron salt.

6. The process of claim 2 wherein said iron-containing addition agent in (2) is a ferro or ferri organic compound selected from the group consisting of naphthenates, oxalates, acetates, citrates, benzoates, oleates, tartrates, and mixtures thereof.

7. The process of claim 1 wherein said heavy liquid hydrocarbonaceous fuel having a nickel and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

8. The process of claim 1 wherein said petroleum coke addition agent in (2) has a particle size in the range of about 2000 microns to 210 microns.

9. The process of claim 2 wherein said iron-containing addition agent comprises calcium oxide in the amount of about 10 to 70 wt. % (basis weight of petroleum coke addition agent), and the remainder comprising iron oxide.

10. The process of claim 1 where included in the petroleum coke addition agent in (2) is a compound that includes an element selected from the group consisting of magnesium, chromium, manganese and mixtures thereof.

11. The process of claim 10 wherein said magnesium, manganese, and chromium compounds are oxides.

12. The process of claim 1 where in the partial oxidation reaction zone said petroleum coke addition agent combines with at least a portion of the nickel constituents and sulfur present to produce a low viscosity liquid phase washing agent which washes substantially all of the vanadium-containing oxide laths and spinels out of the reaction zone.

13. The process of claim 2 wherein the iron-containing addition agent in (2) comprises an iron compound selected from the group consisting of oxides, sulfides, sulfates, carbonates, cyanides, chlorides, nitrates, and mixtures thereof.

14. The process of claim 1 wherein the petroleum coke addition agent in (2) comprises a mixture of the silicates of Fe, Ca, Mg, and Al; wherein the wt. ratio of addition agent to ash from the feed after partial oxidation is in the range of 0.5 to 10.

15. The process of claim 2 wherein the iron-containing addition agent in (2) comprises an iron sulfide containing material or iron and sulfur containing reactant materials that react in the gasifier to produce iron and sulfur containing compounds; and wherein the amount of iron in the molten ash is greater than 10.0 wt. %.

16. The process of claim 2 wherein the iron-containing addition agent in (2) comprises an inorganic or organic iron compound or elemental iron with or without a calcium compound; and wherein the weight ratio of iron to vanadium in the reaction zone is at least 10.

17. The process of claim 1 wherein the petroleum coke addition agent in (2) comprises a mixture comprising 50 wt. % or more of a manganese compound and the remainder comprising a silicon compound; and wherein the weight ratio of addition agent to the ash in the ash-containing fuel is in the range of about 1.0 to 10.

18. The process of claim 1 wherein the petroleum coke addition agent in (2) comprises a copper compound; and wherein the weight ratio of copper-containing additive to ash in the fuel feedstock is in the range of about 1.0 to 10.

19. The process of claim 1 wherein the petroleum coke addition agent in (2) comprises a silicon compound, a titanium compound, and mixtures thereof; and wherein the weight ratio of addition agent to ash in the ash-containing fuel is in the range of about 0.5 to 10.

20. The process of claim 1 wherein said petroleum coke addition agent is introduced into the coking zone in (2) as a pumpable slurry in a liquid hydrocarbonaceous fuel.

21. The process of claim 1 wherein said petroleum coke addition agent is introduced into the coking zone in (2) suspended in a carrier gas selected from the group consisting of steam, CO₂, N₂, recycle synthesis gas, and mixtures thereof.

22. A process for the production of gaseous mixtures comprising H₂+CO by the partial oxidation of a feedstock comprising petroleum coke having a nickel and vanadium-containing ash; and said fuel feedstock includes a minimum of 0.5 wt. % of sulfur; and said ash includes a minimum of 5.0 wt. % vanadium, a minimum of 2.0 wt. % of nickel and up to about 50,000 parts per million (ppm) of silicon; said process comprising:

(1) introducing a heavy liquid hydrocarbonaceous fuel feedstock having a nickel and vanadium-containing ash and containing sulfur at a temperature in the range of about 800° to 895° F. upwardly into the bottom of a delayed coking zone; (2) simultaneously, introducing an iron-containing addition agent having a particle size in the range of about 3000 microns to 38 microns, or below, into the upper section of said coking zone above the upper level of the material in said coking zone being converted into petroleum coke, wherein the weight ratio of said iron-containing addition agent to ash in the fuel feedstock present in the partial oxidation reaction zone in (6) is in the range of about 0.5–10.0 to 1.0; where in said coking zone the iron-containing addition agent falls by gravity into the swirling liquid hydrocarbonaceous fuel feedstock rising from below and a portion of said iron-containing addition agent reacts with a portion of the sulfur in said fuel feestock to produce iron oxy-sulfide and iron and nickel sulfide compounds and said reacted and unreacted portions of the iron-containing addition agent are well dispersed in the heavy liquid hydrocarbonaceous fuel in said coking zone during the filling period and a portion of the holding period, wherein said iron-containing addition agent comprises an inorganic or organic iron compound or elemental iron with or without a calcium compound; and wherein the weight ratio or iron to vanadium in the reaction zone is at least 10; (3) coking said heavy liquid hydrocarbonaceous fuel feed from (2) in said coking zone to produce petroleum coke having a nickel and vanadium-containing ash and having dispersed therein said iron oxy-sulfide compounds, sulfide compounds or iron and nickel, and unreacted petroleum coke addition agent; (4) removing solid petroleum coke and removinq gaseous materials comprising hydrocarbon gases, $H_2O$, and a reduced amount of $H_2S$ and $SO_2$ from said coking zone; (5) grinding said petroleum coke from (4) to a particle size in the range of about 44 microns to 850 microns; and (6) introducing said ground petroleum coke as the fuel feed into a refractory lined free-flow unobstructed downflowing partial oxidation reaction zone where said petroleum coke is reacted with a free-oxygen containing gas at a temperature in the range of about 2200° F. to about 3000° F. and a pressure in the range of about 5 to 250 atmospheres, a $H_2O$/fuel weight ratio in the range of about 0.1 to 5.1 an atomic ratio (O/C) in the range of about 0.6 to 1.6, in the presence of a temperature moderator and in a reducing atmosphere to produce a hot raw effluent gas stream comprising $H_2+CO$ and a reduced amount $H_2S$ and COS, if any in comparison with the amount of $H_2S$ and COS that would be produced without said iron-containing addition agent; and molten slag comprising vanadium, nickel, and other constituents of the ash in said fuel which are fluxed or washed by said iron-containing addition agent and the oxy-sulfide and sulfide reaction products thereof.

23. The process of claim 22 wherein said heavy liquid hydrocarbonaceous fuel having a nickel and vanadium-containing ash feedstock is selected from the group consisting of crude residue from petroleum distillation and cracking process operations, petroleum distillate, reduced crude, whole crude, asphalt, coal tar, coal derived oil, shale oil, tar sand oil, and mixtures thereof.

24. The process of claim 22 wherein (6) said iron-containing addition agent combines with at least a portion of the nickel constituents and sulfur present to produce a low viscosity liquid phase washing agent which washes substantially all of the vanadium constituents of the ash out of the reaction zone.

* * * * *

UNITED STATES PATENT AND TRADEMARK OFFICE
CERTIFICATE OF CORRECTION

PATENT NO. : 4,801,402
DATED : January 31, 1989
INVENTOR(S) : M.S. Najjar and W.C. Gates It is certified that error appears in the above—identified patent and that said Letters Patent is hereby corrected as shown below:

| | |
|---|---|
| Column 12 line 61 | Change "aid" to --said-- |
| Column 13 line 11 | After "$H_2O$" insert --/-- |
| Column 13 line 13 | Change "atmoic" to --atomic-- |
| Column 13 line 13 | After "0" insert --/-- |
| Column 13 lines 34, 40, 42 and 57 | Change "2" to --22-- |
| Column 14 lines 8, 18 and 24 | Change "2" to --22-- |
| Column 14 line 60 | Change "50,000" to --150,000-- |
| Column 16 line 8 | Change "5.1" to --5.0-- |

Signed and Sealed this

Fifth Day of December, 1989

*Attest:*

JEFFREY M. SAMUELS

*Attesting Officer*      *Acting Commissioner of Patents and Trademarks*